US010708076B2

(12) United States Patent
Koskinen et al.

(10) Patent No.: US 10,708,076 B2
(45) Date of Patent: Jul. 7, 2020

(54) SINGLE CELL POINT-TO-MULTIPOINT TRANSMISSION

(71) Applicant: Nokia Technologies Oy, Espoo (FI)

(72) Inventors: Jussi-Pekka Koskinen, Oulu (FI); Ilkka Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 163 days.

(21) Appl. No.: 15/041,210

(22) Filed: Feb. 11, 2016

(65) Prior Publication Data

US 2016/0241413 A1 Aug. 18, 2016

Related U.S. Application Data

(60) Provisional application No. 62/115,327, filed on Feb. 12, 2015.

(51) Int. Cl.
| | |
|---|---|
| *H04L 12/18* | (2006.01) |
| *H04W 76/40* | (2018.01) |
| *H04W 4/70* | (2018.01) |
| *H04W 4/06* | (2009.01) |
| *H04W 60/04* | (2009.01) |
| *H04W 8/22* | (2009.01) |
| *H04W 48/20* | (2009.01) |
| *H04W 36/00* | (2009.01) |

(52) U.S. Cl.
CPC ........... *H04L 12/189* (2013.01); *H04W 76/40* (2018.02); *H04W 4/06* (2013.01); *H04W 4/70* (2018.02); *H04W 8/22* (2013.01); *H04W 36/0007* (2018.08); *H04W 48/20* (2013.01); *H04W 60/04* (2013.01)

(58) Field of Classification Search
CPC ..... H04W 72/005; H04W 4/06; H04W 4/005; H04W 76/002; H04L 2001/0093
See application file for complete search history.

(56) References Cited

U.S. PATENT DOCUMENTS

| | | | | |
|---|---|---|---|---|
| 2008/0267109 | A1* | 10/2008 | Wang | H04W 72/005 370/312 |
| 2010/0061308 | A1* | 3/2010 | Becker | H04W 60/04 370/328 |
| 2010/0189027 | A1* | 7/2010 | Ishida | H04W 48/12 370/312 |

(Continued)

FOREIGN PATENT DOCUMENTS

WO WO-2013/025235 A1 2/2013

OTHER PUBLICATIONS

R3-080247, "MBMS Service Continuity", Huawei, 3GPP TSG RAN WG3 Meeting #59, Feb. 2008, 2 pgs.

(Continued)

*Primary Examiner* — Marsha D Banks Harold
*Assistant Examiner* — Elton Williams
(74) *Attorney, Agent, or Firm* — Harrington & Smith

(57) ABSTRACT

An apparatus determines a signal to be sent dependent on at least one triggering event. The signal is determined based upon at least one of at least one rule and at least one condition. The at least one of at least one rule and at least one condition is determined dependent on input comprising at least one of apparatus type, apparatus capabilities, traffic type, service type, and connection type. The signal is transmitted by the apparatus based upon the at least one triggering event.

20 Claims, 3 Drawing Sheets

(56) References Cited

U.S. PATENT DOCUMENTS

2012/0311101 A1* 12/2012 Chao ................... H04L 12/189
709/219
2014/0112236 A1* 4/2014 Jung ................... H04W 76/002
370/312

OTHER PUBLICATIONS

3GPP TS 36.300 V8.9.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Jun. 2009, 159 pgs.
R2-150252, "Kick-off of SC-PTM", Huawei, HiSilicon, 3GPP TSG-RAN WG2 Meeting #89, Feb. 2015, 5 pgs.
R2-150484, "PTM Service Continuity", Qualcomm Incorporated, 3GPP TSG RAN WG2 #89, Feb. 2015, 3 pgs.
RP-142205, "New Study Item Proposal for Support of single-cell point-to-multipoint transmission in LTE", Huawei, HiSilicon, 3GPP TSG RAN Meeting #66, Dec. 2014, 6 pgs.

* cited by examiner

SINGLE CELL POINT-TO-MULTIPOINT TRANSMISSION

CROSS-REFERENCE TO RELATED APPLICATIONS

The present application claims the benefit under 35 U.S.C. § 119(e) of U.S. Provisional Patent Application No. 62/115,327, filed on Feb. 12, 2015, the disclosure of which is hereby incorporated by reference in its entirety.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

3GPP RAN2 has started a Study Item (SI) on single cell point-to-multipoint (SC-PTM) transmission mode. The feature is intended to provide means for multicasting service data to a formed group of UEs on a per cell basis. It is assumed that the MBMS architecture will be re-used as much as possible. The services/applications are running in a group communication server or application server, GCS-AS, which may reside out of the mobile network.

Group services may be used for public safety use cases or mission critical push-to-talk (MCPTT) service, but not limited to those; also commercial applications, for example, vehicular communication or non-public safety may be supported.

The defined group of UEs for a service is tracked and their location continuously updated in order to be able to support service continuity. The UE may be RRC connected or the UE could be idle.

The UE re-selections in idle are not normally known to the network unless the UE moves from the tracking area to another where a tracking area update (TAU) procedure is needed. If the SC-PTM service is available for idle mode UEs, and as the SC-PTM by definition is configured on a per cell basis, the network does not have sufficient information to initiate required actions if a UE of a SC-PTM group moves out of the cell coverage. That is, the network does not have sufficient information for reselecting another cell.

Accordingly, there is a need for enhancing communication to allow efficient tracking for all UEs within a group and thereby provide desired network support service continuity.

The following abbreviations, which may be found in the specification and/or the drawing figures, are defined as follows:

3GPP third generation partnership project
CN Core network
GW Gateway
HSS Home subscription server
M2M Machine-to-machine
MBMS Multimedia Broadcast Multicast Service
MCE MBMS Coordination Entity
MME Mobility management entity
MT Mobile terminated
MTC Machine-Type Communications
PLMN Public Land Mobile Network
RAN Radio access network
SC-PTM Single Cell point-to-multipoint
SIB System information block
TA Tracking area
TAU Tracking area update
Tx Transmitter/Transmission
UE User equipment

BRIEF SUMMARY

This section is intended to include examples and is not intended to be limiting.

In accordance with a non-limiting embodiment, an apparatus determines a signal to be sent dependent on at least one triggering event. The signal is determined based upon at least one of at least one rule and at least one condition. The at least one of at least one rule and at least one condition is determined dependent on input comprising at least one of apparatus type, apparatus capabilities, traffic type, service type, and connection type. The signal is transmitted by the apparatus based upon the at least one triggering event.

The triggering event may be at least one of autonomous according to predefined rules, configured by a network in communication with the apparatus, dependent on a type of the apparatus, dependent on a location of the apparatus, requested by the network in communication with the apparatus, and independent on an idle/connected state of the apparatus. The signal may indicate at least one of apparatus type, apparatus identification, cell identification, carrier, network type, radio access technology, service identification, temporary mobile group identity, and group indication. The signal transmitted by the apparatus may enable a network in communication with the apparatus to configure the apparatus for multicast transmission. The network may comprise a single cell point-to-multipoint network. The signal may indicate one of a cell re-selection indication, called cell update indication and called apparatus location indication. The input may include an indication of apparatus type of the apparatus. The apparatus type may include one of single cell point-to-multipoint capable user equipment and machine-type communications terminal.

In accordance with another exemplary embodiment, an apparatus, comprising: at least one processor; and at least one memory including computer program code, the at least one memory and the computer program code configured to, with the at least one processor, cause the apparatus to perform at least the following: determine, by the apparatus, a signal to be sent dependent on at least one triggering event, where the signal is determined based upon at least one of at least one rule and at least one condition, where said at least one of at least one rule and at least one condition is determined dependent on input comprising at least one of apparatus type, apparatus capabilities, traffic type, service type, and connection type; and transmit the signal by the apparatus based upon the at least one triggering event.

In accordance with another exemplary embodiment, a signal determined by an apparatus is received, where the signal is determined based upon at least one of at least one rule and at least one condition. The at least one of at least one rule and at least one condition is determined dependent on input comprising at least one of apparatus type, apparatus capabilities, traffic type, service type, and connection type. The signal is transmitted by the apparatus based upon at least one triggering event.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for single cell point-to-multipoint transmission. Additional description of these techniques is presented after a system into which the exemplary embodiments may be used is described.

Figure 1:
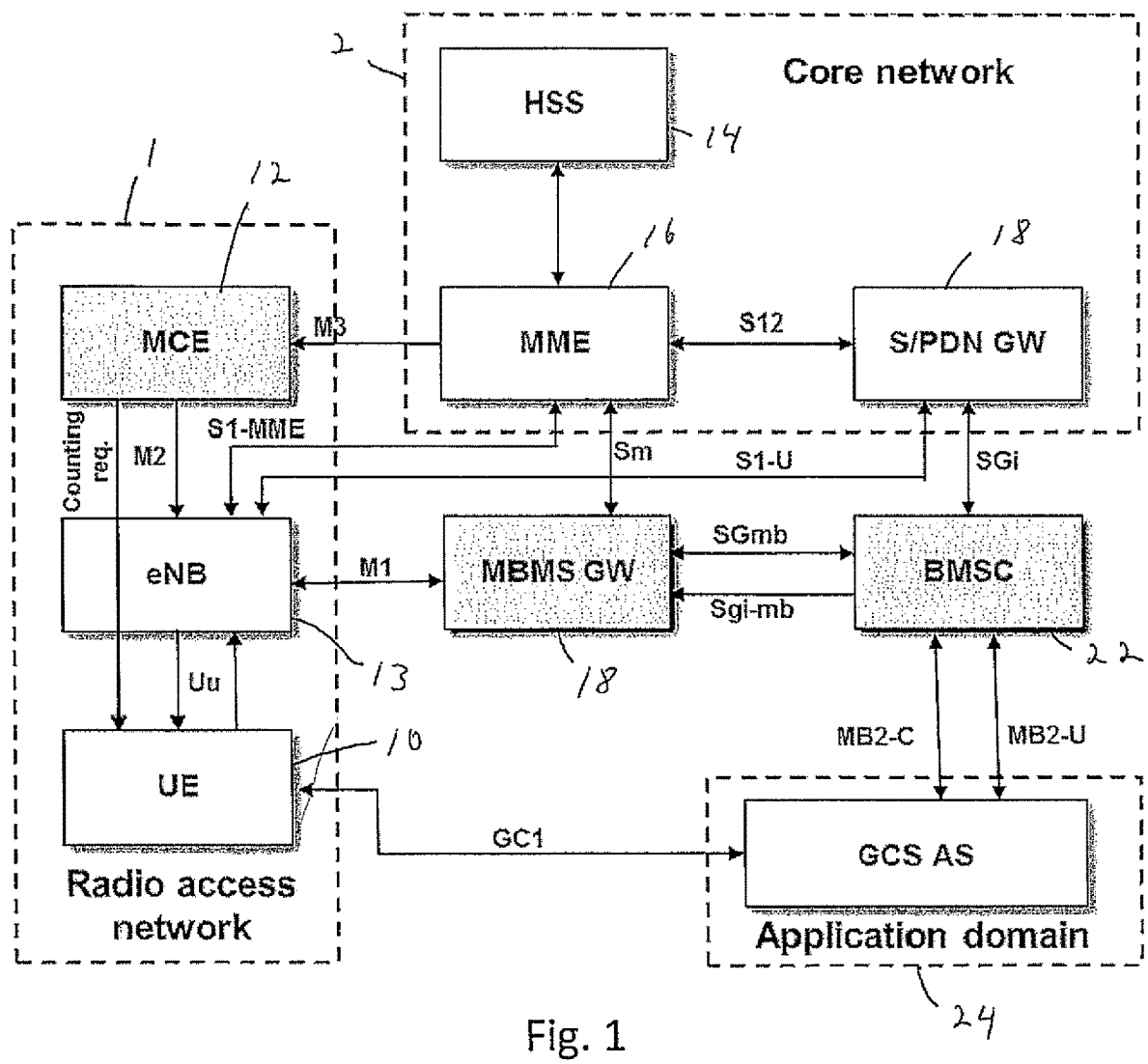
FIG. 1 illustrates an example network architecture.

An example network architecture is illustrated in FIG. 1. This MBMS architecture may be used for Single Cell point-to-multipoint (SC-PTM) transmission. Single cell point-to-multipoint (SC-PTM) transmission mode is a feature intended to provide means for multicasting service data to a formed group of User Equipment (UE) on a per cell basis. In one example, the Multimedia Broadcast Multicast Service (MBMS) architecture may be re-used as much as possible. The services/applications may be running in a group communication server or application server (GCS AS) 24 which may reside outside of a mobile network.

Figure 2:
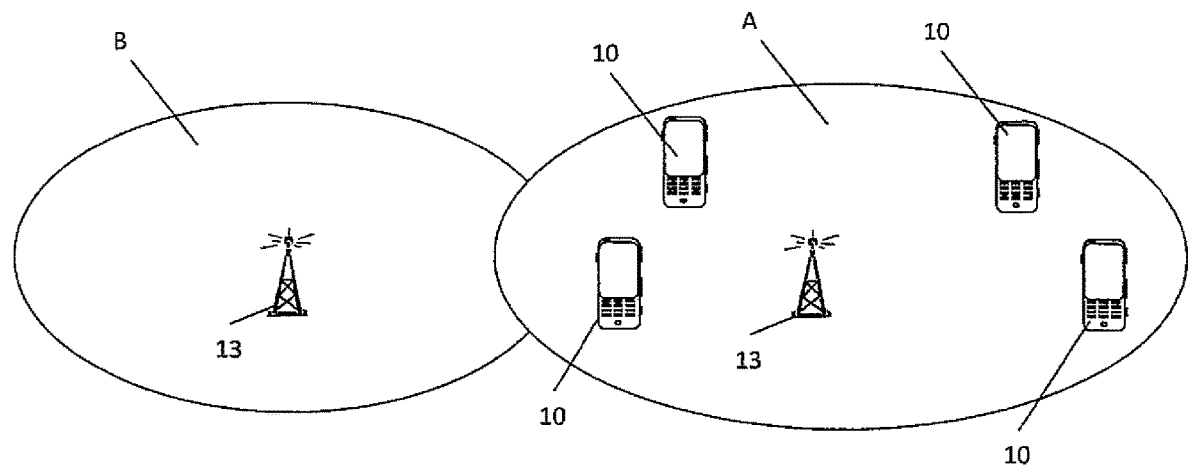
FIG. 2 illustrates a base station having a cell for communicating with UEs in that cell.

In the example shown in FIG. 1 the radio access network 1 comprises the UEs 10, base stations 13 which is an eNB (E-UTRAN Node B (evolved Node B)) in this example, and a Multi-cell/multicast Coordination Entity (MCE) 12. The core network 2 generally comprises a home subscription server (HSS) 14, a mobility management entity (MME) 16 and a Serving and Packet Data Network gateway(s) (S/PDN GW) 18. The architecture shown in FIG. 1 also comprises a MBMS gateway 20 and a Broadcast multicast service center (BMSC) 22. In alternate examples, additional or alternate features may be provided. As seen in FIG. 2, each base station 13 may have a cell A, B, etc. for UEs 10 in that cell. Some of the components of the UEs 10, base stations 13 and other components are described in FIG. 5 below.

Group services may be used, for example, for public safety use cases or mission critical push-to-talk (MCPTT) services. However, it is not limited to those services. For example, it may be used for commercial applications such as vehicular communication or non-public safety may be supported. The defined group of UEs for a service may be tracked, and their location may be continuously updated in order to be able to support service continuity. The UE may be in radio resource control (RRC) connected, but it could be also in idle. Features as described herein may be used to enhance operation to allow efficient tracking for all UEs within a group. This may be used to provide means for the network to support desired service continuity.

Features as described herein may be used to provide a novel principle where the signaling, triggered by a specified or configured event(s), can vary depending on the UE type and/or UE capabilities and/or on the traffic, service or connection type. Thus, the signaling may be initiated per defined rules or conditions where the rules/conditions can be either pre-configured (specified in advance for all UE and service scenarios) or configured (in order to allow adaptation for the varying UE and service scenarios).

An example method may comprise:
The UE providing terminal/feature specific signaling information to the network.
The signaling could be triggered by the UE such as, for example, based on the following:
  Autonomously according to pre-defined (specified) rules.
  If configured by the network (dynamic or semi-dynamic manner i.e. with signaling or pre-provision). The configuration could be UE type or supported feature specific.
  With procedure per UE type.
  When the location of the UE changes. Granularity of the location could be, for example, cell/(e)NodeB/TA/RA/LA/PLMN/carrier/frequency.
  When requested by the network. Optionally the network would request certain UE type(s) to report signaling.
  Regardless of the UE state (idle/connected).
  Any combination of above.
  The signaling message may include further information such as, for example, UE type, identification, Cell ID/carrier/PLMN/RAT, Service ID/TMGI/group indication, etc.
Any combination of above
Based on the proposed procedures and related information the network, such as in the case of Single Cell point-to-multipoint (SC-PTM) for example, is provided with sufficient information to configure or reconfigure the multicast transmission to adapt to changing UE and service scenarios.

For the signaling noted above, this may comprise Assistance/calculation/indicating a specific feature, such as SC-PTM for example or the like. For UE type noted above, this may comprise UE category/group/subscription/terminal type/UE mobility/based on the specific feature support.

Taking the SC-PTM as an example how the method could be applied, an example method may comprise the following:
When UE makes a cell re-selection, it may notify the network by sending a cell re-selection indication (or called cell update indication, or called UE location indication) but only when the applied "rules" or "conditions" tell it to do so. The rules and conditions can have multiple inputs which can affect when and how cell update indications shall be sent.
The novel input might be "terminal type". The "type" can be, for example, SC-PTM capable UE, some kind of MTC terminal (with specific capabilities).
The MTC terminal can be, for example, a low cost/complexity terminal with coverage enhancements where the DL transmission (e.g. paging) has to be adapted to UE reception capabilities. In such a case, the knowledge about UE re-selections will allow reliable operation. Then, different types of UEs can use different "rules" or "conditions" which allows different UEs to behave in an optimum manner while communicating with the network in certain situations.

One of the examples for connection type is the SC-PTM multicasting where the network may be able to track UEs of a multicast group. The transmission mode (group scheduling) may be limited to one cell at a time. This is why the network should know about the UEs actively receiving the service(s) carried on the SC-PTM transmission and leaving/entering the SC-PTM cell. Then different types of connections can use different "rules" or "conditions" which allows different types of connections to behave differently in certain situations.

The UE specific operation may be either pre-configured (specified in a standard) or there can be separate signaling to configure the operation. The operation could be also "normal" (what any UE would do normally) if no specific configuration is sent, such as when no UE specific operation is mandated in a standard. Configurability may allow optimized operation for varying UE and service/transmission scenarios.

Features as described herein may provide means and sufficient information for optimized configuration/reconfiguration of the SC-PTM transmission when there are changes within the multicast group. Further this eliminates the need for cross-layer information exchange, e.g. between application (service) layer and the access stratum (AS). The eventual network operation may depend on the selected SC-PTM architecture.

Although features are described herein as being used with a UE, features may be used with a SC-PTM group informing about the cell re-selection. The UE may indicate, with a signaling message about the re-selection to a new cell, that the UE in idle mode and shall establish RRC connection in order to transfer the information. The information may be sent during the connection establishment procedure (on RRC layer) with additional information element, or there could be a new signaling (procedure) and/or message specified for the indication followed by the establishment procedure. Re-selection may be indicated in idle mode after/during ATTACH or Tracking Area Update (TAU) procedures, or after any cell selection/reselection within a tracking area, change of carrier, etc. The eNB may forward the UE indication to MCE or MBMB GW (which in turn can relay the information to BMSC). Alternatively the eNB may re-configure the SC-PTM transmission and/or informs the selected/reselected cell about the UE entering the cell while having group service(s) active. The eNB information to the eNB of the re-selected can include relevant information about the SC-PTM configuration and service parameters (e.g. service type, service id or TMGI, etc). The Network will be aware of the mobility of the UEs within the defined group for a particular SC-PTM (or MBMS) service which are requested or required to inform about the re-selections.

This approach allows the Network to react to UE mobility in order to try to maintain the service provisioning and/or to re-configure the SC-PTM (or MEMS) transmission. The decision about the reaction to UE indications can be done either at the eNB, MCE, MBMS GW, BMSC, or in some of the CN nodes assuming that the UE indication is made available to CN nodes (MME, SIP-GW). This also allows immediate reaction to changes in the group of UE allowing such as, for example, elimination of service interrupts. System information block (SIB) broadcasting adaption may be provided based on the existence of active SC-PTM services, or based on the knowledge of UEs receiving or intending to receive service(s) on SC-PTM or MBMS transmission within the cell. The knowledge about UEs wishing to receive services on SC-PTM or MBMS can be based on the indications sent by the UEs. This approach may also comprise any combination of above.

A particularly advantageous use of the method is with SC-PTM or MBMS(/MBSFN) transmission within a certain (limited) geographical area. The number of UEs may be sufficiently large so that the multicast option is superior over the unicast transmission. This, however, requires adequate and fast enough configuration/reconfiguration of the transmission within one or more cell areas in order to guarantee service continuity for the subscribed (for the services/groups) UEs. The configuration/reconfiguration may be supported by the specific signaling (triggered with appropriate conditions) initiated by the UEs receiving SC-PTM or MBMS. However, the applicability is not limited to the above examples, and can be implementable to multiple other use cases and scenarios.

With features as described herein, the UE may send signaling under applied rules or conditions, and the rules and conditions may have multiple inputs which affects when and how signaling is to be sent. The inputs may comprises at least one of UE type, UE capabilities, traffic type, service type and connection type. Signaling can vary depending on one of the inputs. Different UE types/UE capabilities/traffic types/service types/connection types can use different "rules" or "conditions", and then can behave differently in certain situations. The "rule" or "condition" in case of SC-PTM or MBMS may be the intention to receive multicast service in a re-selected cell, actively receiving the multicast service, UE moving to a cell which is not sending a service UE is intending to receive or actively receiving, UE stopping active reception of one or more multicast services in the serving cell, or the like. The signaling may also be "conditioned" based on the UE capabilities to receive only either one of the SC-PTM or MBMS service, support of reception on the band or frequency transmitting SC-PTM or MBMS, UE being either in RRC connected or RRC idle, or the like. The signaling may be related, for example, to SC-PTM. The signaling may be, for example, a cell update information. The rules/conditions may be either pre-configured (specified in advance for all UE and service scenarios) or configured (in order to allow adaptation for the varying UE and service scenarios). Other triggering events may be used.

Conventionally, the UE re-selections in idle are not normally known to the network unless the UE moves from the tracking area to another; a tracking area update (TAU) procedure is then needed. In the case when the SC-PTM service is available also for idle mode UEs, and as the SC-PTM by definition is configured on per cell basis, conventionally the network does not have sufficient information to initiate required actions if a UE of a SC-PTM group moves out of the cell coverage, i.e. reselecting another cell. Features as described herein, on the other hand, enable efficient tracking of UEs and configuration/reconfiguration of the multicast transmission to adapt to changes within the multicast group or changes with the services. Features as described herein also allows improved service continuity with various mobility scenarios. Additional signaling may be used for the UEs (particularly in idle mode) to provide sufficient information for optimized multicast transmission within a cell or within an area covered by multiple cells.

Figure 5:
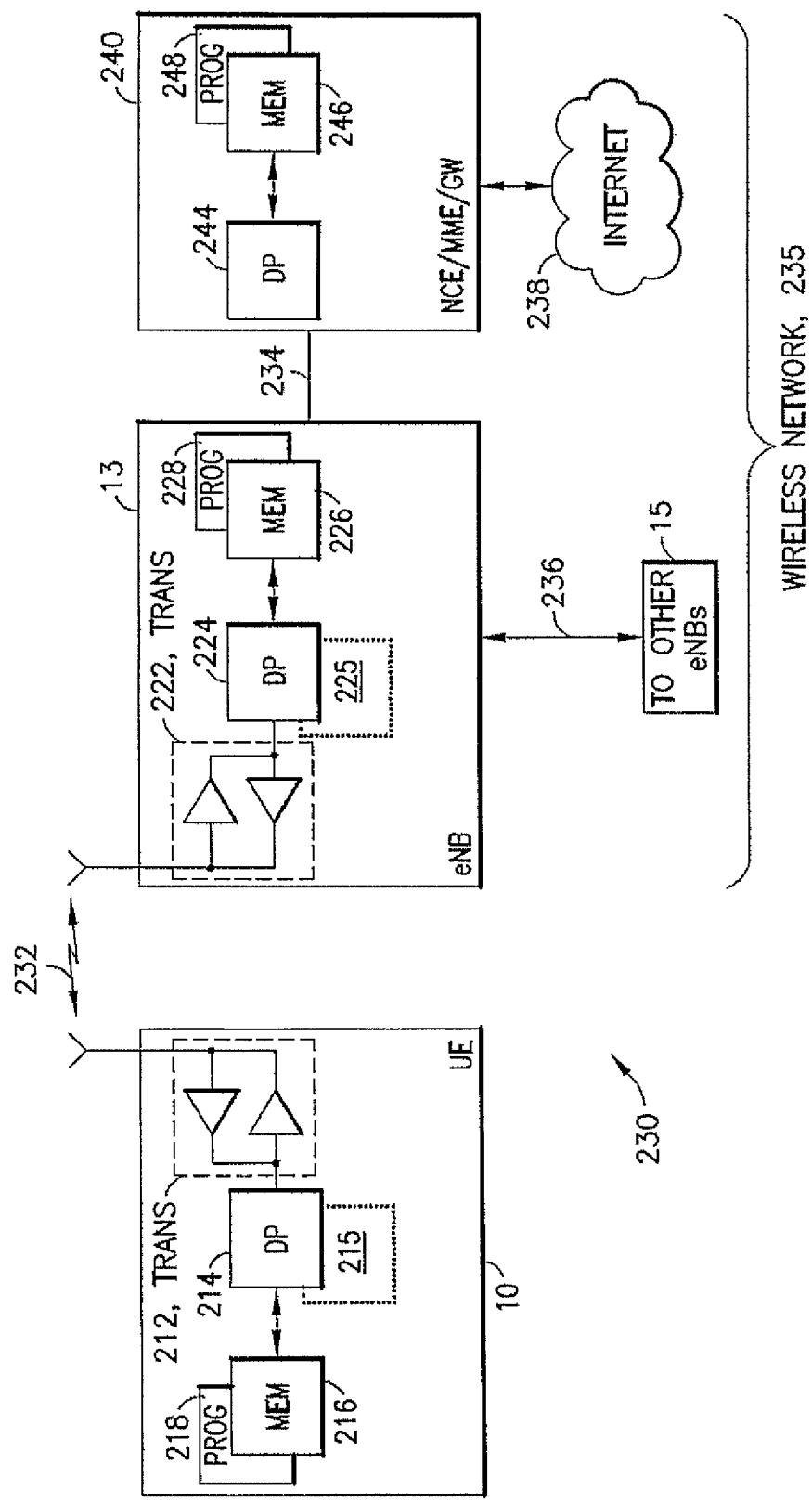
FIG. 5 is a block diagram of one possible and non-limiting exemplary system in which the exemplary embodiments may be practiced.

Referring also to FIG. 5, in the wireless system 230 a wireless network 235 is adapted for communication over a wireless link 232 with an apparatus, such as a mobile communication device which may be referred to as a UE 10, via a network access node, such as a Node B (base station), and more specifically an eNB 13. The network 235 may include a network control element (NCE) 240 that may include MME/S-GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 via one or more antennas.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 may be implemented as an interface. The eNB 13 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station 15 may have the same type of components as the base station 13.

For the purposes of describing various exemplary embodiments in accordance with this invention the UE 10 and the eNB 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 3:
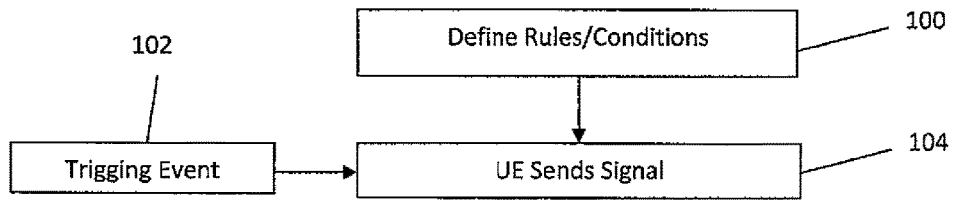
FIG. 3 is a logic flow diagram for single cell point-to-multipoint transmission, and illustrates the operation of an exemplary method, a result of execution of computer program instructions embodied on a computer readable memory, functions performed by logic implemented in hardware, and/or interconnected means for performing functions in accordance with exemplary embodiments.

Referring also to FIG. 3, an example method may comprise determining, as indicated by block 100, by an apparatus a signal to be sent upon at least one triggering event 102, where the signal is determined based upon at least one rule and/or condition, where the at least one rule and/or condition is determined based upon input comprising at least one of: apparatus type, apparatus capabilities, traffic type, service type, connection type; and transmitting the signal by the apparatus based upon the at least one triggering event as indicated by block 104.

An embodiment may be provided in an apparatus comprising at least one processor; and at least one non-transitory memory including computer program code, the at least one memory and the computer program code configured to, with the at least one processor, cause the apparatus to: determine a signal to be sent upon at least one triggering event, where the signal is determined based upon at least one rule and/or condition, where the at least one rule and/or condition is determined based upon input comprising at least one of: apparatus type, apparatus capabilities, traffic type, service type, connection type; and transmit the signal based upon the at least one triggering event.

An example embodiment may be provided in a non-transitory program storage device (such as memory 216 for example) readable by a machine, tangibly embodying a program of instructions executable by the machine for performing operations, the operations comprising: determining by an apparatus a signal to be sent upon at least one triggering event, where the signal is determined based upon at least one rule and/or condition, where the at least one rule and/or condition is determined based upon input comprising at least one of: apparatus type, apparatus capabilities, traffic type, service type, connection type; and transmitting the signal by the apparatus based upon the at least one triggering event.

An example embodiment may be provided in an apparatus comprising means for determining by an apparatus a signal to be sent upon at least one triggering event, where the signal is determined based upon at least one rule and/or condition, where the at least one rule and/or condition is determined based upon input comprising at least one of: apparatus type, apparatus capabilities, traffic type, service type, connection type; and means for transmitting the signal by the apparatus based upon the at least one triggering event.

Figure 4:
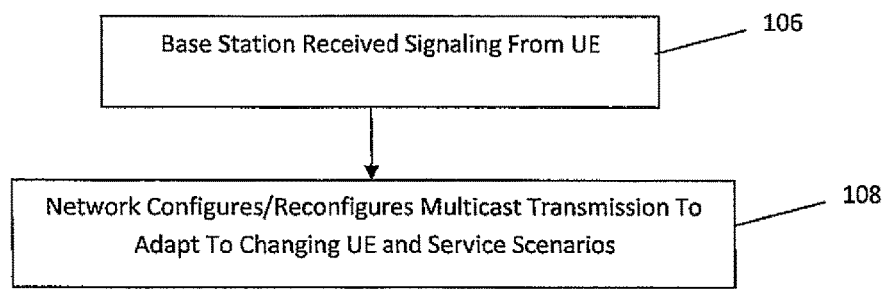
FIG. 4 is another logic flow diagram for single cell point-to-multipoint transmission, and illustrates the operation of an exemplary method, a result of execution of computer program instructions embodied on a computer readable memory, functions performed by logic implemented in hardware, and/or interconnected means for performing functions in accordance with exemplary embodiments.

Referring also to FIG. 4, an example method may comprise receiving by a base station a signal from a User Equipment as indicated by block 106, where the signal is a triggering event(s) based signal, where the signal has a configuration based upon at least one rule and/or condition determined based upon input comprising at least one of: User Equipment type, User Equipment capabilities, traffic type, service type, connection type; and reconfiguring a multicast transmission to be sent by a network comprising the base station based, at least partially, upon the signal received by the base station as indicated by block 108.

An example embodiment may be provided in an apparatus comprising at least one processor; and at least one non-transitory memory including computer program code, the at least one memory and the computer program code configured to, with the at least one processor, cause the apparatus to: receive by the apparatus a signal from a User Equipment, where the signal is a triggering event(s) based signal, where the signal has a configuration based upon at least one rule and/or condition, where the at least one rule and/or condition is determined based upon input comprising at least one of: User Equipment type, User Equipment capabilities, traffic type, service type, connection type; and reconfigure a multicast transmission to be sent by a network comprising the base station based, at least partially, upon the signal received by the base station.

An example embodiment may be provided in an apparatus comprising means for receiving by a base station a signal from a User Equipment, where the signal is a triggering event(s) based signal, where the signal has a configuration based upon at least one rule and/or condition, where the at least one rule and/or condition is determined based upon input comprising at least one of: User Equipment type, User Equipment capabilities, traffic type, service type, connection type; and means for reconfiguring a multicast transmission to be sent by a network comprising the base station based, at least partially, upon the signal received by the base station.

An example embodiment may be provided in a non-transitory program storage device (such as memory 226 for example) readable by a machine, tangibly embodying a program of instructions executable by the machine for performing operations, the operations comprising: receiving by a base station a signal from a User Equipment, where the signal is a triggering event(s) based signal, where the signal has a configuration based upon at least one rule and/or condition, where the at least one rule and/or condition is determined based upon input comprising at least one of: User Equipment type, User Equipment capabilities, traffic type, service type, connection type; and reconfiguring a multicast transmission to be sent by a network comprising the base station based, at least partially, upon the signal received by the base station.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications and variances.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
   determining, by a user equipment of a communication network, a signal to be sent in response to at least one triggering event,
   wherein the at least one triggering event is based upon at least one of at least one rule and at least one condition received from the communication network and pre-configured or configured at the user equipment,
   wherein said at least one of said at least one rule and at least one condition is based on an input comprising user equipment type, and location of the user equipment,
   wherein the at least one of at least one rule and at least one condition comprises a dynamic configuration based on at least the type and the location of the user equipment, and on service parameters associated with one of a single cell point-to-multipoint transmission mode or a multimedia broadcast multicast service transmission mode for the signal, and
   based on the configuration, transmitting the signal by the user equipment in response to the at least one triggering event, wherein the signal indicates that the user equipment requests to receive service on one of a single cell point-to-multipoint transmission mode or a multimedia broadcast multicast service transmission mode when the user equipment performs at least one of a cell re-selection, called cell update, and called user equipment location.

2. The method according to claim 1, wherein the triggering event is autonomous according to predefined rules, and is performed regardless of an idle or connected state of the user equipment.

3. The method according to claim 1, wherein the signal further indicates at least one of the user equipment type, user equipment identification, cell identification, carrier, network type, radio access technology, service identification, temporary mobile group identity, and group indication.

4. The method according to claim 1, wherein the communication network comprises a single cell point-to-multipoint network, and wherein the signal transmitted by the user equipment enables the single cell point-to-multipoint network in communication with the user equipment to configure the user equipment for multicast transmission.

5. The method according to claim 4, wherein the at least one of said at least one rule and at least one condition are pre-configured or configured at the user equipment based at least on the single cell point-to-multipoint type user equipment type of the user equipment and based on at least one of different user equipment capabilities, different traffic types, different service types, and different connection types associated with the user equipment.

6. The method according to claim 4, wherein the transmitting comprises the signal is varied in the single cell point-to-multipoint network with a single cell point-to-multipoint transmission format based on said single cell point-to-multipoint user equipment type.

7. The method according to claim 1, wherein the at least one rule comprises the user equipment is moving to a cell which is not sending a service that is actively being received by the user equipment, and wherein the at least one condition comprises user equipment capability to receive either a single cell point-to-multipoint service or multimedia broadcast multicast service.

8. An apparatus, comprising:
   at least one processor; and at least one memory including computer program code, the at least one memory and the computer program code configured to, with the at least one processor, cause the apparatus to at least:

determine, by the apparatus, a signal to be sent by a user equipment of a communication network in response to at least one triggering event, where the at least one triggering event is determined based upon at least one of at least one rule and at least one condition received from the communication network and pre-configured or configured at the user equipment, wherein said at least one of at least one rule and at least one condition is based on an input comprising user equipment type, and location of the user equipment, and wherein the at least one of at least one rule and at least one condition comprises a dynamic configuration based on at least the type and the location of the user equipment, and on service parameters associated with one of a single cell point-to-multipoint transmission mode or a multimedia broadcast multicast service transmission mode for the signal, and based on the configuration, transmit the signal by the apparatus from the user equipment based upon the at least one triggering event, wherein the signal indicates that the user equipment requests to receive a service on one of a single cell point-to-multipoint transmission mode or a multimedia broadcast multicast service transmission mode when the user equipment performs at least one of a cell re-selection, called cell update, and called user equipment location for the user equipment.

9. The apparatus according to claim 8, wherein the triggering event is autonomous according to predefined rules, and is performed regardless of an idle or connected state of the user equipment.

10. The apparatus according to claim 8, wherein the signal further indicates at least one of the user equipment type, user equipment identification, cell identification, carrier, network type, radio access technology, service identification, temporary mobile group identity, and group indication.

11. The apparatus according to claim 8, wherein the communication network comprises a single cell point-to-multipoint network, and wherein the signal transmitted by the apparatus from the user equipment enables the single cell point-to-multipoint network in communication with the user equipment to configure the user equipment for multicast transmission.

12. The apparatus according to claim 11, wherein the at least one of said at least one rule and at least one condition are pre-configured or configured at the user equipment based at least on the single cell point-to-multipoint type user equipment type of the user equipment, and based on at least one of different user equipment capabilities, different traffic types, different service types, and different connection types associated with the user equipment.

13. The apparatus according to claim 8, wherein the transmitting comprises the signal is varied with a single cell point-to-multipoint transmission format based on said single cell point-to-multipoint user equipment type.

14. The apparatus according to claim 8, wherein the user equipment type includes one of single cell point-to-multipoint capable user equipment and a machine-type communications terminal.

15. The apparatus according to claim 8, wherein the signal is conditioned based on one of the user equipment type and the user equipment capabilities to receive only one of single cell point-to-multipoint service and multimedia broadcast multicast service.

16. The apparatus according to claim 8, wherein different rules or conditions are used for at least one of different user equipment types, different user equipment capabilities, different traffic types, different service types, and different connection types.

17. A method, comprising:

receiving a signal determined by a user equipment dependent on at least one triggering event at the user equipment, wherein the at least one triggering event is based upon at least one of at least one rule and at least one condition pre-configured or configured at the user equipment, wherein said at least one of at least one rule and at least one condition comprises a dynamic configuration based on at least the type and the location of the user equipment, and on service parameters associated with one of a single cell point-to-multipoint transmission mode or a multimedia broadcast multicast service transmission mode for the signal, and wherein the signal is indicating that the user equipment requests to receive service on one of a single cell point-to-multipoint transmission mode or a multimedia broadcast multicast service transmission mode when the user equipment performs based on the configuration at least one of a cell re-selection, called cell update, and called user equipment location for the user equipment.

18. The method according to claim 17, wherein the triggering event is autonomous according to predefined rules, and is received regardless of an idle or connected state of the user equipment.

19. The method according to claim 17, wherein the signal further indicates at least one of the user equipment type, user equipment identification, cell identification, carrier, network type, radio access technology, service identification, temporary mobile group identity, and group indication.

20. The method according to claim 17, wherein the signal is varied with a single cell point-to-multipoint transmission format based on said single cell point-to-multipoint user equipment type.

* * * * *

UNITED STATES PATENT AND TRADEMARK OFFICE
CERTIFICATE OF CORRECTION

PATENT NO. : 10,708,076 B2
APPLICATION NO. : 15/041210
DATED : July 7, 2020
INVENTOR(S) : Jussi-Pekka Koskinen and Ilkka Keskitalo It is certified that error appears in the above-identified patent and that said Letters Patent is hereby corrected as shown below:

In Claim 5:
Column 10, Line 49, "type" should be deleted.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*